US008645449B1

(12) United States Patent
Langhammer (10) Patent No.: US 8,645,449 B1
(45) Date of Patent: Feb. 4, 2014

(54) COMBINED FLOATING POINT ADDER AND SUBTRACTOR

(75) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 1055 days.

(21) Appl. No.: 12/396,826

(22) Filed: Mar. 3, 2009

(51) Int. Cl.
*G06F 7/42* (2006.01)

(52) U.S. Cl.
USPC .......................................... 708/505

(58) Field of Classification Search
None
See application file for complete search history.

(56) References Cited

U.S. PATENT DOCUMENTS

| | | |
|---|---|---|
| 3,473,160 A | 10/1969 | Wahlstrom |
| 3,697,734 A | 10/1972 | Booth et al. |
| 3,800,130 A | 3/1974 | Martinson et al. |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,575,812 A | 3/1986 | Kloker et al. |
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barkan |
| 4,754,421 A | 6/1988 | Bosshart |
| 4,791,590 A | 12/1988 | Ku et al. |
| 4,799,004 A | 1/1989 | Mori |
| 4,823,260 A | 4/1989 | Imel et al. |
| 4,823,295 A | 4/1989 | Mader |
| 4,839,847 A | 6/1989 | Laprade |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Altera Corporation, "FIR Compiler: MegaCore® Function User Guide," version 3.3.0, rev. 1, pp. 3 11 through 3 15 (Oct. 2005).

(Continued)

*Primary Examiner* — Idriss N Alrobaye
*Assistant Examiner* — Dayton Lewis-Taylor
(74) *Attorney, Agent, or Firm* — Ropes & Gray LLP; Jeffrey H. Ingerman (57) ABSTRACT

Circuitry (fixed or configured in a programmable device) for performing floating point addition and subtraction uses approximately the same resources as required for either operation separately. The circuitry is based on a recognition that when adding or subtracting two numbers, the two resulting mantissa values will be two out of three possibilities, and will involve either a one-bit shifting operation, or a shifting operation involving a large number of bits. Therefore, one mantissa path—a subtraction path—can be provided with full add/normalize/round circuitry, while a second mantissa path—an addition path—can be provided with a simple one-bit shifter and simplified rounding circuitry. Because the input numbers are signed, the "addition path," which only adds the mantissas, may provide the mantissa for the subtraction result, depending on the signs of the input numbers. Similarly, the "subtraction path" may provide the mantissa for the addition result.

28 Claims, 5 Drawing Sheets

(56) References Cited

U.S. PATENT DOCUMENTS

| | | | |
|---|---|---|---|
| 4,871,930 A | 10/1989 | Wong et al. | |
| 4,893,268 A | 1/1990 | Denman et al. | |
| 4,908,788 A | 3/1990 | Fujiyama | |
| 4,912,345 A | 3/1990 | Steele et al. | |
| 4,918,637 A | 4/1990 | Morton | |
| 4,967,160 A | 10/1990 | Quievy et al. | |
| 4,982,354 A | 1/1991 | Takeuchi et al. | |
| 4,991,010 A | 2/1991 | Hailey et al. | |
| 4,994,997 A | 2/1991 | Martin et al. | |
| 4,999,803 A * | 3/1991 | Turrini et al. | 708/505 |
| 5,073,863 A | 12/1991 | Zhang | |
| 5,081,604 A | 1/1992 | Tanaka | |
| 5,122,685 A | 6/1992 | Chan et al. | |
| 5,128,559 A | 7/1992 | Steele | |
| 5,175,702 A | 12/1992 | Beraud et al. | |
| 5,208,491 A | 5/1993 | Ebeling et al. | |
| RE34,363 E | 8/1993 | Freeman | |
| 5,267,187 A | 11/1993 | Hsieh et al. | |
| 5,296,759 A | 3/1994 | Sutherland et al. | |
| 5,338,983 A | 8/1994 | Agarwala | |
| 5,339,263 A | 8/1994 | White | |
| 5,349,250 A | 9/1994 | New | |
| 5,357,152 A | 10/1994 | Jennings, III et al. | |
| 5,371,422 A | 12/1994 | Patel et al. | |
| 5,373,461 A | 12/1994 | Bearden et al. | |
| 5,375,079 A | 12/1994 | Uramoto et al. | |
| 5,381,357 A | 1/1995 | Wedgwood et al. | |
| 5,404,324 A | 4/1995 | Colon-Bonet | |
| 5,424,589 A | 6/1995 | Dobbelaere et al. | |
| 5,446,651 A | 8/1995 | Moyse et al. | |
| 5,451,948 A | 9/1995 | Jekel | |
| 5,452,231 A | 9/1995 | Butts et al. | |
| 5,452,375 A | 9/1995 | Rousseau et al. | |
| 5,457,644 A | 10/1995 | McCollum | |
| 5,465,226 A | 11/1995 | Goto | |
| 5,465,375 A | 11/1995 | Thepaut et al. | |
| 5,483,178 A | 1/1996 | Costello et al. | |
| 5,497,498 A | 3/1996 | Taylor | |
| 5,500,812 A | 3/1996 | Saishi et al. | |
| 5,500,828 A | 3/1996 | Doddington et al. | |
| 5,523,963 A | 6/1996 | Hsieh et al. | |
| 5,528,550 A | 6/1996 | Pawate et al. | |
| 5,537,601 A | 7/1996 | Kimura et al. | |
| 5,541,864 A | 7/1996 | Van Bavel et al. | |
| 5,546,018 A | 8/1996 | New et al. | |
| 5,550,993 A | 8/1996 | Ehlig et al. | |
| 5,559,450 A | 9/1996 | Ngai et al. | |
| 5,563,526 A | 10/1996 | Hastings et al. | |
| 5,563,819 A | 10/1996 | Nelson | |
| 5,570,039 A | 10/1996 | Oswald et al. | |
| 5,570,040 A | 10/1996 | Lytle et al. | |
| 5,572,148 A | 11/1996 | Lytle et al. | |
| 5,581,501 A | 12/1996 | Sansbury et al. | |
| 5,590,350 A | 12/1996 | Guttag et al. | |
| 5,594,366 A | 1/1997 | Khong et al. | |
| 5,594,912 A | 1/1997 | Brueckmann et al. | |
| 5,596,763 A | 1/1997 | Guttag et al. | |
| 5,606,266 A | 2/1997 | Pedersen | |
| 5,617,058 A | 4/1997 | Adrian et al. | |
| 5,631,848 A | 5/1997 | Laczko et al. | |
| 5,633,601 A | 5/1997 | Nagaraj | |
| 5,636,150 A | 6/1997 | Okamoto | |
| 5,636,368 A | 6/1997 | Harrison et al. | |
| 5,640,578 A | 6/1997 | Balmer et al. | |
| 5,644,519 A | 7/1997 | Yatim | |
| 5,644,522 A | 7/1997 | Moyse et al. | |
| 5,646,545 A | 7/1997 | Trimberger et al. | |
| 5,646,875 A | 7/1997 | Taborn et al. | |
| 5,648,732 A | 7/1997 | Duncan | |
| 5,652,903 A | 7/1997 | Weng et al. | |
| 5,655,069 A | 8/1997 | Ogawara et al. | |
| 5,664,192 A | 9/1997 | Lloyd et al. | |
| 5,689,195 A | 11/1997 | Cliff et al. | |
| 5,696,708 A | 12/1997 | Leung | |
| 5,729,495 A | 3/1998 | Madurawe | |
| 5,740,404 A | 4/1998 | Baji | |
| 5,744,980 A | 4/1998 | McGowan et al. | |
| 5,744,991 A | 4/1998 | Jefferson et al. | |
| 5,754,459 A | 5/1998 | Telikepalli | |
| 5,761,483 A | 6/1998 | Trimberger | |
| 5,764,555 A | 6/1998 | McPherson et al. | |
| 5,768,613 A | 6/1998 | Asghar | |
| 5,771,186 A | 6/1998 | Kodali et al. | |
| 5,777,912 A | 7/1998 | Leung et al. | |
| 5,784,636 A | 7/1998 | Rupp | |
| 5,790,446 A | 8/1998 | Yu et al. | |
| 5,794,067 A | 8/1998 | Kadowaki | |
| 5,801,546 A | 9/1998 | Pierce et al. | |
| 5,805,477 A | 9/1998 | Perner | |
| 5,805,913 A | 9/1998 | Guttag et al. | |
| 5,808,926 A | 9/1998 | Gorshtein et al. | |
| 5,812,479 A | 9/1998 | Cliff et al. | |
| 5,812,562 A | 9/1998 | Baeg | |
| 5,815,422 A | 9/1998 | Dockser | |
| 5,821,776 A | 10/1998 | McGowan | |
| 5,825,202 A | 10/1998 | Tavana et al. | |
| 5,838,165 A | 11/1998 | Chatter | |
| 5,841,684 A | 11/1998 | Dockser | |
| 5,847,579 A | 12/1998 | Trimberger | |
| 5,847,978 A | 12/1998 | Ogura et al. | |
| 5,847,981 A | 12/1998 | Kelley et al. | |
| 5,859,878 A | 1/1999 | Phillips et al. | |
| 5,869,979 A | 2/1999 | Bocchino | |
| 5,872,380 A | 2/1999 | Rostoker et al. | |
| 5,874,834 A | 2/1999 | New | |
| 5,878,250 A | 3/1999 | LeBlanc | |
| 5,880,981 A | 3/1999 | Kojima et al. | |
| 5,892,962 A | 4/1999 | Cloutier | |
| 5,894,228 A | 4/1999 | Reddy et al. | |
| 5,898,602 A | 4/1999 | Rothman et al. | |
| 5,931,898 A | 8/1999 | Khoury | |
| 5,942,914 A | 8/1999 | Reddy et al. | |
| 5,944,774 A | 8/1999 | Dent | |
| 5,949,710 A | 9/1999 | Pass et al. | |
| 5,951,673 A | 9/1999 | Miyata | |
| 5,956,265 A | 9/1999 | Lewis | |
| 5,959,871 A | 9/1999 | Pierzchala et al. | |
| 5,960,193 A | 9/1999 | Guttag et al. | |
| 5,961,635 A | 10/1999 | Guttag et al. | |
| 5,963,048 A | 10/1999 | Harrison et al. | |
| 5,963,050 A | 10/1999 | Young et al. | |
| 5,968,196 A | 10/1999 | Ramamurthy et al. | |
| 5,970,254 A | 10/1999 | Cooke et al. | |
| 5,978,260 A | 11/1999 | Trimberger et al. | |
| 5,982,195 A | 11/1999 | Cliff et al. | |
| 5,986,465 A | 11/1999 | Mendel | |
| 5,991,788 A | 11/1999 | Mintzer | |
| 5,991,898 A | 11/1999 | Rajski et al. | |
| 5,995,748 A | 11/1999 | Guttag et al. | |
| 5,999,015 A | 12/1999 | Cliff et al. | |
| 5,999,990 A | 12/1999 | Sharrit et al. | |
| 6,005,806 A | 12/1999 | Madurawe et al. | |
| 6,006,321 A | 12/1999 | Abbott | |
| 6,009,451 A | 12/1999 | Burns | |
| 6,018,755 A | 1/2000 | Gonikberg et al. | |
| 6,020,759 A | 2/2000 | Heile | |
| 6,021,423 A | 2/2000 | Nag et al. | |
| 6,029,187 A | 2/2000 | Verbauwhede | |
| 6,031,763 A | 2/2000 | Sansbury | |
| 6,041,339 A | 3/2000 | Yu et al. | |
| 6,041,340 A | 3/2000 | Mintzer | |
| 6,052,327 A | 4/2000 | Reddy et al. | |
| 6,052,755 A | 4/2000 | Terrill et al. | |
| 6,052,773 A | 4/2000 | DeHon et al. | |
| 6,055,555 A | 4/2000 | Boswell et al. | |
| 6,064,614 A | 5/2000 | Khoury | |
| 6,065,131 A | 5/2000 | Andrews et al. | |
| 6,066,960 A | 5/2000 | Pedersen | |
| 6,069,487 A | 5/2000 | Lane et al. | |
| 6,072,994 A | 6/2000 | Phillips et al. | |
| 6,073,154 A | 6/2000 | Dick | |
| 6,075,381 A | 6/2000 | LaBerge | |
| 6,084,429 A | 7/2000 | Trimberger | |
| 6,085,317 A | 7/2000 | Smith | |

(56) References Cited

U.S. PATENT DOCUMENTS

| | | |
|---|---|---|
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,108,772 A | 8/2000 | Sharangpani |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,346,824 B1 | 2/2002 | New |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,578,060 B2 | 6/2003 | Chen et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,915,322 B2 | 7/2005 | Hong |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,024,446 B2 | 4/2006 | Langhammer et al. |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,230,451 B1 | 6/2007 | Langhammer |
| 7,313,585 B2 | 12/2007 | Winterrowd |
| 7,343,388 B1 | 3/2008 | Burney et al. |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,650,374 B1 | 1/2010 | Gura et al. |
| 7,668,896 B2 | 2/2010 | Lutz et al. |
| 7,719,446 B2 | 5/2010 | Rosenthal et al. |
| 7,720,898 B2 | 5/2010 | Driker et al. |
| 7,769,797 B2 | 8/2010 | Cho et al. |
| 7,814,136 B1 | 10/2010 | Verma et al. |
| 7,822,799 B1 | 10/2010 | Langhammer et al. |
| 7,917,567 B1 | 3/2011 | Mason et al. |
| 7,930,335 B2 | 4/2011 | Gura |
| 7,930,336 B2 | 4/2011 | Langhammer |
| 8,024,394 B2 | 9/2011 | Prokopenko |
| 8,090,758 B1 | 1/2012 | Shimanek et al. |
| 8,112,466 B2 | 2/2012 | Minz et al. |
| 2001/0023425 A1 | 9/2001 | Oberman et al. |
| 2001/0029515 A1 | 10/2001 | Mirsky |
| 2001/0037352 A1 | 11/2001 | Hong |
| 2002/0002573 A1 | 1/2002 | Landers et al. |
| 2002/0032713 A1 | 3/2002 | Jou et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2003/0065699 A1 | 4/2003 | Burns |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |

(56) References Cited

U.S. PATENT DOCUMENTS

| | | |
|---|---|---|
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |
| 2005/0262175 A1 | 11/2005 | Iino et al. |
| 2006/0020655 A1 | 1/2006 | Lin |
| 2006/0112160 A1 | 5/2006 | Ishii et al. |
| 2007/0083585 A1 | 4/2007 | St. Denis et al. |
| 2007/0185951 A1 | 8/2007 | Lee et al. |
| 2007/0185952 A1 | 8/2007 | Langhammer et al. |
| 2007/0241773 A1 | 10/2007 | Hutchings et al. |
| 2008/0133627 A1 | 6/2008 | Langhammer et al. |
| 2008/0159441 A1 | 7/2008 | Liao et al. |
| 2008/0183783 A1 | 7/2008 | Tubbs |
| 2009/0083358 A1 | 3/2009 | Allen |
| 2009/0113186 A1 | 4/2009 | Kato et al. |
| 2009/0172052 A1 | 7/2009 | DeLaquil et al. |
| 2009/0182795 A1 | 7/2009 | Dobbek et al. |
| 2009/0187615 A1 | 7/2009 | Abe et al. |
| 2009/0228689 A1 | 9/2009 | Muff et al. |
| 2009/0292750 A1 | 11/2009 | Reyzin et al. |
| 2009/0300088 A1 | 12/2009 | Michaels et al. |
| 2010/0098189 A1 | 4/2010 | Oketani |
| 2010/0146022 A1* | 6/2010 | Swartzlander et al. ....... 708/505 |
| 2010/0191939 A1 | 7/2010 | Muff et al. |
| 2012/0166512 A1 | 6/2012 | Wong et al. |

FOREIGN PATENT DOCUMENTS

| | | |
|---|---|---|
| EP | 0 411 491 | 2/1991 |
| EP | 0 419 105 | 3/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO 2005/066832 | 7/2005 |
| WO | WO2005/101190 | 10/2005 |

OTHER PUBLICATIONS

Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.

Govindu, G. et al., "Analysis of High-performance Floating-point Arithmetic on FPGAs," *Proceedings of the 18th International Parallel and Distributed Processing Symposium (PDPS'04)* pp. 149-156, Apr. 2004.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Vladimirova, T. et al., "Floating-Point Mathematical Co-Processor for a Single-Chip On-Board Computer," *MAPLD'03 Conference, D5*, Sep. 2003.

Altera Corporation, "DSP Blocks in Stratix II and Stratix II GX Devices " *Stratix II Device Handbook*, vol. 2, Chapter 6, v4.0 (Oct. 2005).

Underwood, K. "FPGAs vs. CPUs: Trends in Peak Floating-Point Performance," *Proceedings of the 2004 ACM/SIGDA 12th International Symposium on Field Programmable Gate Arrays*, pp. 171-180, Feb. 22-24, 2004.

Xilinx Inc., "XtremeDSP Design Considerations User Guide," v 1.2, Feb. 4, 2005.

Altera Corporation, "Digital Signal Processing (DSP)," *Stratix Device Handbook*, vol. 2, Chapter 6 and Chapter 7, v1.1 (Sep. 2004).

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," *3rd International Conference on Design and Technology of Integrated Systems in Nanoscale Era*, 6 pgs., Mar. 2008.

Zhou, G. et al., "Efficient and High-Throughput Implementations of AES-GCM on FPGAs," *International Conference on Field-Programmable Technology*, 8 pgs., Dec. 2007.

Amos, D., "PLD architectures match DSP algorithms " *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science vol. 1896)*, Aug. 27-30, 2000, pp. 456-461.

Aoki, T., "Signed-weight arithmetic and its application to a field-programmable digital filter architecture," *IEICE Transactions on Electronics* , 1999 , vol. E82C, No. 9, Sep. 1999, pp. 1687-1698.

Ashour, M.A., et al., "An FPGA implementation guide for some different types of serial-parallel multiplier-structures," *Microelectronics Journal* , vol. 31, No. 3, 2000, pp. 161-168.

Berg. B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

(56) References Cited

OTHER PUBLICATIONS

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

Guccione, S.A.,"Run-time Reconfiguration at Xilinx " *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http://www.ee.washington.edu/people/faculty/hauck/publications/ReconfigFuture.PDF.

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science vol. 1896)*, Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA® FPGA Express™ Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings (IEEE Cat. No. 96TH8140)*, Oct. 21-24, 1996, pp. 275-279.

Jones, G., "Field-programmable digital signal conditioning," *Electronic Product Design*, vol. 21, No. 6, Jun. 2000, pp. C36-C38.

Kiefer, R., et al., "Performance comparison of software/FPGA hardware partitions for a DSP application " *14th Australian Microelectronics Conference. Microelectronics: Technology Today for the Future. MICRO '97 Proceedings*, Sep. 28-Oct. 1, 1997, pp. 88-93.

Kramberger, I., "DSP acceleration using a reconfigurable FPGA," *ISIE '99. Proceedings of the IEEE International Symposium on Industrial Electronics (Cat. No. 99TH8465)*, vol. 3 , Jul. 12-16, 1999, pp. 1522-1525.

Langhammer, M., "How to implement DSP in programmable logic " *Elettronica Oggi*, No. 266 , Dec. 1998, pp. 113-115.

Langhammer, M., "Implementing a DSP in Programmable Logic " *Online EE Times*, May 1998, http://www.eetimes.com/editorial/1998/coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems (Digest)* No. 233, 1998, pp. 2/1-2/4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation (Cat. No. 91CH2976-9)*, vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference (Cat. No. 00EX404)*, Sep. 10-13, 2000, pp. 135-138.

Parhami, B., "Configurable arithmetic arrays with data-driven control " *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications (Cat. No. 99EX303)*, Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL'99, Proceedings (Lecture Notes in Computer Science vol. 1673)*, Lysaght, P., et al., eds., Aug. 30-Sep. 1, 1999, pp. 264-273.

Tralka, C., "Symbiosis of DSP and PLD," *Elektronik*, vol. 49, No. 14 , Jul. 11, 2000, pp. 84-96.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http://mathworld.wolfram.com/KaratsubaMultiplication.html.

Wenzel, L., "Field programmable gate arrays (FPGAs) to replace digital signal processor integrated circuits," *Elektronik* , vol. 49, No. 5, Mar. 7, 2000, pp. 78-86.

(56) References Cited

OTHER PUBLICATIONS

"Xilinx Unveils New FPGA Architecture to Enable High-Performance, 10 Million System Gate Designs", *Xilinx*, Jun. 22, 2000.
"Xilinx Announces DSP Algorithms, Tools and Features for Virtex-II Architecture", *Xilinx*, Nov. 21, 2000.
Xilinx Inc., "Virtex-II 1.5V Field-Programmable Gate Arrays", Advance Product Specification, DS031-2 (v1.9), Nov. 29, 2001, Module 2 of 4, pp. 1-39.
Xilinx Inc., "Using Embedded Multipliers", Virtex-II Platform FPGA Handbook, UG002 (v1.3), Dec. 3, 2001, pp. 251-257.
Xilinx, Inc., "A 1D Systolic FIR," copyright 1994-2002, downloaded from http://www.iro.umontreal.ca/~aboulham/F6221/Xilinx%20A%201D%20systolic%20FIR.htm.
Xilinx, Inc., "The Future of FPGA's," White Paper, available Nov. 14, 2005 for download from http://www.xilinx.com/prs_rls,5yrwhite.htm.
Altera Corporation, "Stratix II Device Handbook, Chapter 6—DSP Blocks in Stratix II Devices," v1.1, Jul. 2004.
Xilinx Inc., "Complex Multiplier v2.0", DS291 Product Specification/Datasheet, Nov. 2004.
Martinson, L. et al., "Digital Matched Filtering with Pipelined Floating Point Fast Fourier Transforms (FFT's)," *IEEE Transactions on Acoustics, Speech, and Signal Processing*, vol. ASSP-23, No. 2, pp. 222-234, Apr. 1975.
Altera, "DSP Blocks in Stratix III Devices", Chapter 5, pp. 1-42, Mar. 2010.

Karlström, P., et al., "High Performance, Low Latency FPGA based Floating Point Adder and Multiplier Units in a Virtex 4," Norchip Conf., pp. 31-34, 2006.
Thapliyal, H., et al., "Combined Integer and Floating Point Multiplication Architecture (CIFM) for FPGSs and Its Reversible Logic Implementation", *Proceedings MWSCAS 2006*, Puerto Rico, 5 pages, Aug. 2006.
Thapliyal, H., et al., "Combined Integer and Variable Precision (CIVP) Floating Point Multiplication Architecture for FPGAs", *Proceedings of the 2007 International Conference on Parallel and Distributed Processing Techniques and Applications (PDPTA '07)*, Las Vegas, US, vol. 1, pp. 449-450, Jun. 2007.
Xilinx, Inc., "Virtex-5 ExtremeDSP Design Considerations," *User Guide UG193*, v2.6, 114 pages, Oct. 2007.
Haynes, S.D., et al., "Configurable multiplier blocks for embedding in FPGAs," *Electronics Letters*, vol. 34, No. 7, pp. 638-639 (Apr. 2, 1998).
Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.
Fujioka, Y., et al., "240MOPS Reconfigurable Parallel VLSI Processor for Robot Control," *Proceedings of the 1992 International Conference on Industrial Electronics, Control, Instrumentation, and Automation: Signal Processing and Systems Control; Intelligent Sensors and Instrumentation*, vol. 3, pp. 1385-1390, Nov. 9-13, 1992.
Xilinx, Inc., "Implementing Barrel Shifters Using Multipliers," p. 1-4, Aug. 17, 2004.

\* cited by examiner

COMBINED FLOATING POINT ADDER AND SUBTRACTOR

BACKGROUND OF THE INVENTION

This invention relates to performing floating point arithmetic operations in programmable integrated circuit devices such as programmable logic devices (PLDs). More particularly, this invention relates to circuitry for performing floating point addition and subtraction using approximately the same resources as required for either operation separately.

Certain mathematical operations may require both the sum and difference of two floating point numbers. For example, one technique for computing Fast Fourier Transforms uses a radix-2 butterfly that requires simultaneous addition and subtraction of two numbers. In fixed logic devices, where it is known that such operations will be performed, appropriate circuitry may be provided to efficiently carry out those addition and subtraction operations. However, in programmable devices, where only some particular user logic designs may need to perform such operations, it may be inefficient to provide all of the resources to separately perform such operations. Even in fixed logic, it may be desirable to reduce the required resources for such operations.

SUMMARY OF THE INVENTION

The present invention relates to circuitry for performing floating point addition and subtraction using approximately the same resources as required for either operation separately. The circuitry can be provided in a fixed logic device, or can be configured into a programmable integrated circuit device such as a programmable logic device (PLD).

The present invention is based on a recognition that when adding or subtracting two numbers, the two resulting mantissa values will be two out of three possibilities, and will involve either a one-bit shifting operation, or a shifting operation involving a large number of bits.

Therefore, in accordance with the present invention, there is provided combined floating-point addition and subtraction circuitry for both adding and subtracting a first signed floating-point input number and a second signed floating-point input number, where each of the first and second signed floating-point input numbers has a respective sign, a respective mantissa and a respective exponent, to provide a sum and a difference of said first and second signed floating-point numbers. The combined floating-point addition and subtraction circuitry includes a first mantissa computation path including a first adder for adding the mantissas of the first and second signed floating-point numbers, a one-bit right-shifting circuit for controllably shifting output of the first adder to normalize the output of the first adder, and rounding circuitry for (a) providing a first candidate mantissa and (b) providing a first exponent-adjustment bit. The combined circuitry also includes a second mantissa computation path including a first subtractor for subtracting the mantissa of the second signed floating-point number from the mantissa of the first signed floating-point number to provide a first mantissa difference, a second subtractor for subtracting the mantissa of the first signed floating-point number from the mantissa of the second signed floating-point number to provide a second mantissa difference, a selector for selecting as a mantissa difference output one of those first and second mantissa differences that is positive, and a normalize-and-round circuit for (a) providing a second candidate mantissa and (b) providing a second exponent-adjustment bit. The combined circuitry also includes a first exponent computation path for combining the input stage output exponent and the first exponent adjustment bit to provide a first candidate exponent. The combined circuitry also includes a second exponent computation path for combining the input stage output exponent and the second exponent adjustment bit to provide a second candidate exponent. Finally, the combined circuitry also includes a selection stage for selecting, based on the respective signs, one of the first and second candidate mantissas and one of the first and second candidate exponents for the sum of said first and second signed floating point numbers, and another of the first and second candidate mantissas and another of the first and second candidate exponents for the difference of the first and second signed floating point numbers.

A method of configuring such circuitry on a programmable device, a programmable device so configured, and a machine-readable data storage medium encoded with software for performing the method, are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Floating point numbers are commonplace for representing real numbers in scientific notation in computing systems. Examples of real numbers in scientific notation are:

$3.14159265_{10} \times 10^0$ ($\pi$)

$2.718281828_{10} \times 10^0$ (e)

$0.000000001_{10}$ or $1.0_{10} \times 10^{-9}$ (seconds in a nanosecond)

$3155760000_{10}$ or $3.15576_{10} \times 10^9$ (seconds in a century)

The first two examples are real numbers in the range of the lower integers, the third example represents a very small fraction, and the fourth example represents a very large integer. Floating point numbers in computing systems are designed to cover the large numeric range and diverse precision requirements shown in these examples. Fixed point number systems have a very limited window of representation which prevents them from representing very large or very small numbers simultaneously. The position of the notional binary-point in fixed point numbers addresses this numeric range problem to a certain extent but does so at the expense of precision. With a floating point number the window of representation can move, which allows the appropriate amount of precision for the scale of the number.

Floating point representation is generally preferred over fixed point representation in computing systems because it permits an ideal balance of numeric range and precision. However, floating point representation requires more complex implementation compared to fixed point representation.

The IEEE754-1985 standard is commonly used for floating point numbers. A floating point number includes three different parts: the sign of the number, its mantissa and its exponent. Each of these parts may be represented by a binary number and, in the IEEE754-1985 format, have the following bit sizes:

|  | Sign | Exponent | Bias | Mantissa |
|---|---|---|---|---|
| Single Precision 32-Bit | 1 bit [31] | 8 bits [30...23] | −127 | 23 bits [22...00] |
| Double Precision 64-Bit | 1 bit [63] | 11 bits [62...52] | −1023 | 52 bits [51...0] |

The exponent preferably is an unsigned binary number which, for the single precision format, ranges from 0 to 255. In order to represent a very small number, it is necessary to use negative exponents. To achieve this the exponent preferably has a negative bias associated with it. For single-precision numbers, the bias preferably is −127. For example a value of 140 for the exponent actually represents (140−127) =13, and a value of 100 represents (100−127)=−27. For double precision numbers, the exponent bias preferably is −1023.

As discussed above, according to the standard, the mantissa is a normalized number—i.e., it has no leading zeroes and represents the precision component of a floating point number. Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision. Therefore, in single precision format, the mantissa typically includes 24 bits of precision.

In order to add two floating point numbers having different exponents, one of the numbers has to be denormalized so that the exponents are the same. This may be achieved by left-shifting the larger number by the difference in exponents, or by right-shifting the smaller number by that difference. After the numbers have been "aligned" by denormalization, they may added or subtracted (where subtraction may be addition with one negated input), then (re)normalized. As a further step, the normalized result may be rounded, and compliance with the IEEE754-1985 standard typically includes rounding.

The most straightforward technique to compute both the sum and the difference of the same two numbers is to use two complete separate circuit paths, where one path performs denormalization, addition, (re)normalization and rounding, while the other path performs denormalization, subtraction, (re)normalization and rounding. This technique consumes the maximum possible resources for computing the sum and difference of the same two numbers, namely about twice the resources needed for computing either alone.

Figure 1:
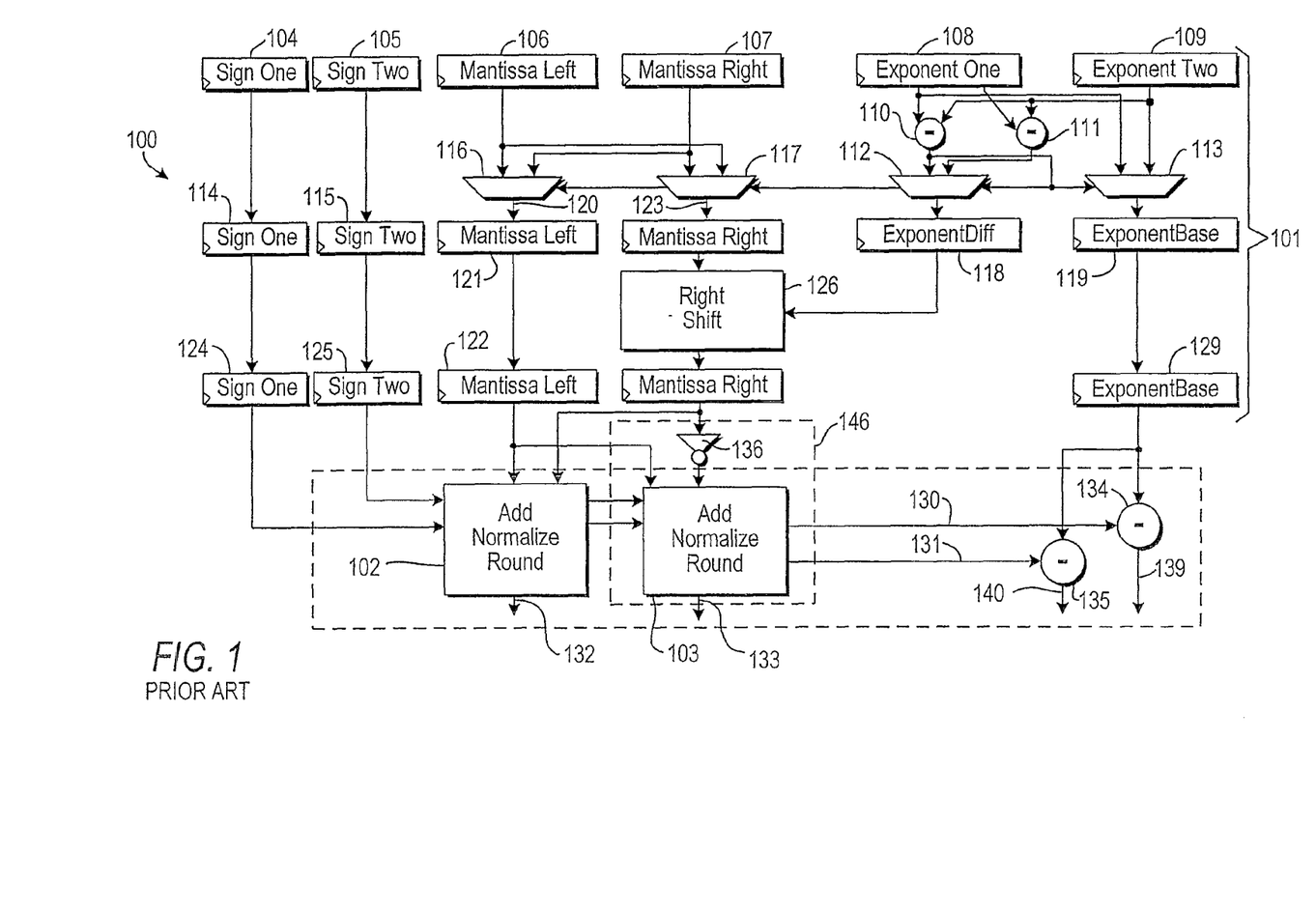
FIG. 1 shows a known arrangement for reducing the resources needed to compute both the sum and the difference of the same two numbers.

A first, known, arrangement 100 for reducing the resources needed to compute both the sum and the difference of the same two numbers is shown in FIG. 1. Arrangement 100 uses a shared input path 101 for denormalization, followed by two separate, independent add(subtract)/(re)normalize/round paths 102, 103.

Shared input path 101 is able to determine which of the two input numbers is larger and to denormalize the smaller number by right-shifting it, and also to select the exponent of the larger number as the resultant exponent. As can be seen, shared input path 101 includes respective register 104, 105 for the respective sign bit of each of the two input numbers, respective register 106, 107 for the respective mantissa of each of the two input numbers, and respective register 108, 109 for the respective exponent of each of the two input numbers.

The sign bits are passed straight through to add(subtract)/(re)normalize/round paths 102, 103. Depending on the particular application, optional pipeline registers 114, 115, 124, 125 may be used for this purpose.

The mantissas and exponents are handled as follows:

Subtractor 110 subtracts the exponent in register 109 from the exponent in register 108, while subtractor 111 subtracts the exponent in register 108 from the exponent in register 109. The two differences are input to multiplexer 112, while the two exponents themselves are input to multiplexer 113. The most significant bit (MSB) of difference 110 is used as the control bit for multiplexers 112, 113. Because difference 110 is a signed number, its MSB will be 0 for a positive difference (exponent 108 greater than exponent 109), thereby selecting difference 110 as the difference 118 and exponent 108 as the resultant exponent 119, or 1 for a negative difference (exponent 109 greater than exponent 108), thereby selecting difference 111 as the difference 118 and exponent 109 as the resultant exponent 119. Exponent 119 is propagated to the final stages, optionally through one or more pipeline registers 129.

Mantissas 106, 107 are similarly input, in respective opposite order, to respective multiplexers 116, 117, which also are controlled by the MSB of difference 110 to select mantissa 106 as part of the larger operand and mantissa 107 as part of the smaller operand when exponent 108 is larger, or mantissa 107 as part of the larger operand and mantissa 106 as part of the smaller operand when exponent 109 is larger. Larger mantissa 120 is input (after pipelining through registers 121, 122 if necessary) to add(subtract)/(re)normalize/round paths 102, 103. Smaller mantissa 123 may be right-shifted at 126 by exponent difference 110/111 so that it may be added (after pipelining through registers 127, 128, if necessary) to, or, after negation at 136, subtracted from, larger mantissa 120 in add(subtract)/(re)normalize/round paths 102, 103 to compute the sum and difference. Add/(re)normalize/round path 103 and inverter 129 may be considered as, and may be replaced by, an integrated subtract/(re)normalize/round path 146.

Each add(subtract)/(re)normalize/round path 102, 103 outputs a sum or difference mantissa 132, 133, as well as an exponent adjustment value 130, 131 which is subtracted at 134, 135 from resultant exponent 119 to yield the final candidate exponents 139, 140. Exponent adjustment values 130, 131 are determined during (re)normalization in paths 102, 103, and their magnitudes depend on the relative magnitudes of the mantissas 120, 123 and whether they are being added or subtracted.

By sharing input stage 101, arrangement 100 is about 50% larger than a single add or subtract path as compared to providing two completely separate add and subtract paths, which would be 100% larger than a single path. Conversely, arrangement 100 may be viewed as being about 30% smaller than two completely separate add and subtract paths.

Figure 2:
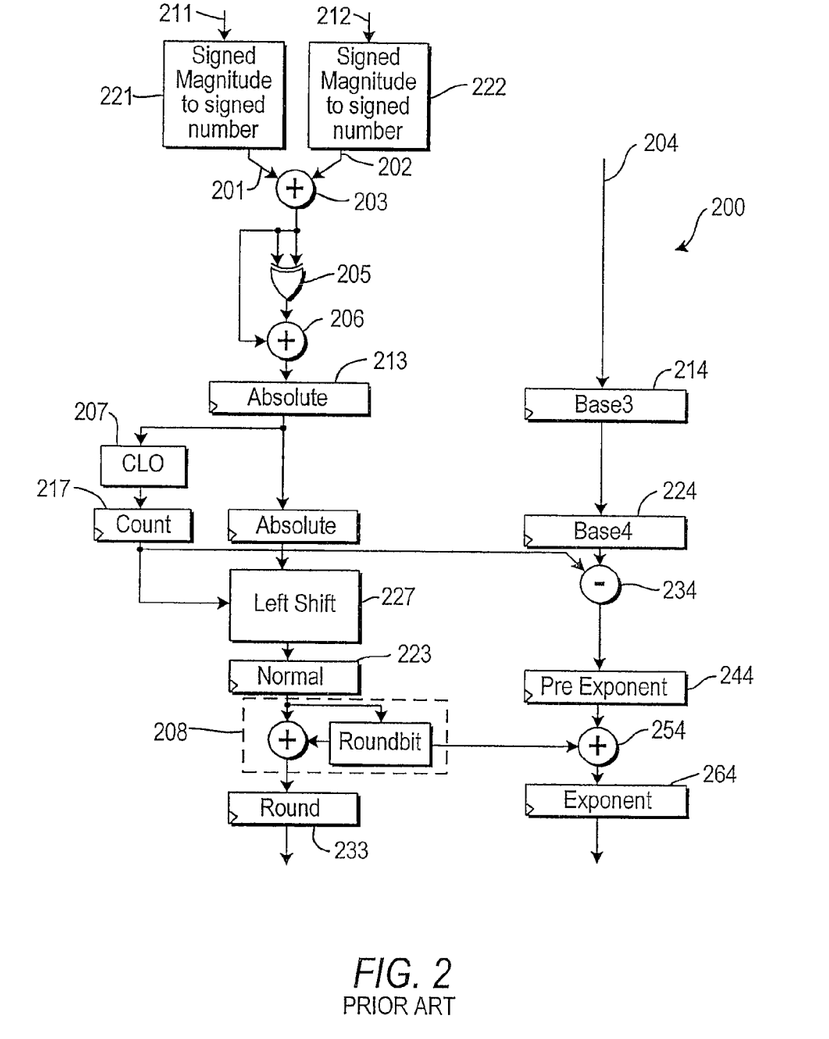
FIG. 2 shows one potential embodiment of an add/normalize/round path in the arrangement of FIG. 1.

FIG. 2 shows one potential embodiment 200 of the add/(re)normalize/round path 102, 103 of FIG. 1. If the operands are in signed-number format, in which the sign of the number is indicated by one of the bits of the number itself, then the operands are input at 201, 202 to adder/subtractor 203. If the operands are in signed-magnitude format, in which the magnitude is always positive and the sign is indicated by a separate bit (or bits), then the operands are input at 211, 212 to respective signed-magnitude-to-signed-number converters 221, 222 for conversion to signed numbers which are then input at 201, 202. The conversion from signed-magnitude format to signed-number format is well known. Either way, the exponent is input at 204, with optional pipelining registers 214, 224. Exclusive-OR gate 205 and adder 206 compute absolute value 213 of the sum or difference 203. The resultant mantissa 213 is normalized by counting leading 0's at 207 (if signed numbers are used, leading 1's may be counted as well), and using the leading 0 count 217 to left-shift mantissa 213 at 227, and to adjust exponent 204 at subtractor 234. Normalized mantissa 223 is then rounded, in a manner which may be well-known, by examining one or more rounding bits (e.g., a "round" bit, a "guard" bit, and a "sticky" bit) at 208, to provide rounded, final mantissa 233. The amount of rounding may require one further adjustment of normalized exponent 244 at 254 to provide final exponent 264.

In accordance with the invention, the resources needed for a simultaneous addition and subtraction of two numbers can be reduced further over the known embodiment of FIGS. 1 and 2.

It may be observed that if two numbers are close in magnitude to each other, then if they are added, their combined magnitude will almost double (a one-bit shift in a binary system), while if they are subtracted the result will be a very small number (a large bit shift from either number). Similarly, if two numbers are far apart in magnitude, then the magnitude of either their sum or their difference will be close to the magnitude of the larger number. Therefore, for addition, there is either no shift or a one-bit shift, while for subtraction, there could be a one-bit shift (if the minuend is negative and similar in magnitude to the subtrahend), or a very large shift (if the result is a very small number).

It also may be observed that if the two inputs have magnitudes A and B, then for computing the magnitude, the two operations will involve two out of the three possibilities A+B (for addition, or for subtraction if B is negative), A−B (for subtraction where B is smaller, or for addition where B is negative), and B−A (for subtraction where A is smaller, or for addition where A is negative).

Figure 3:
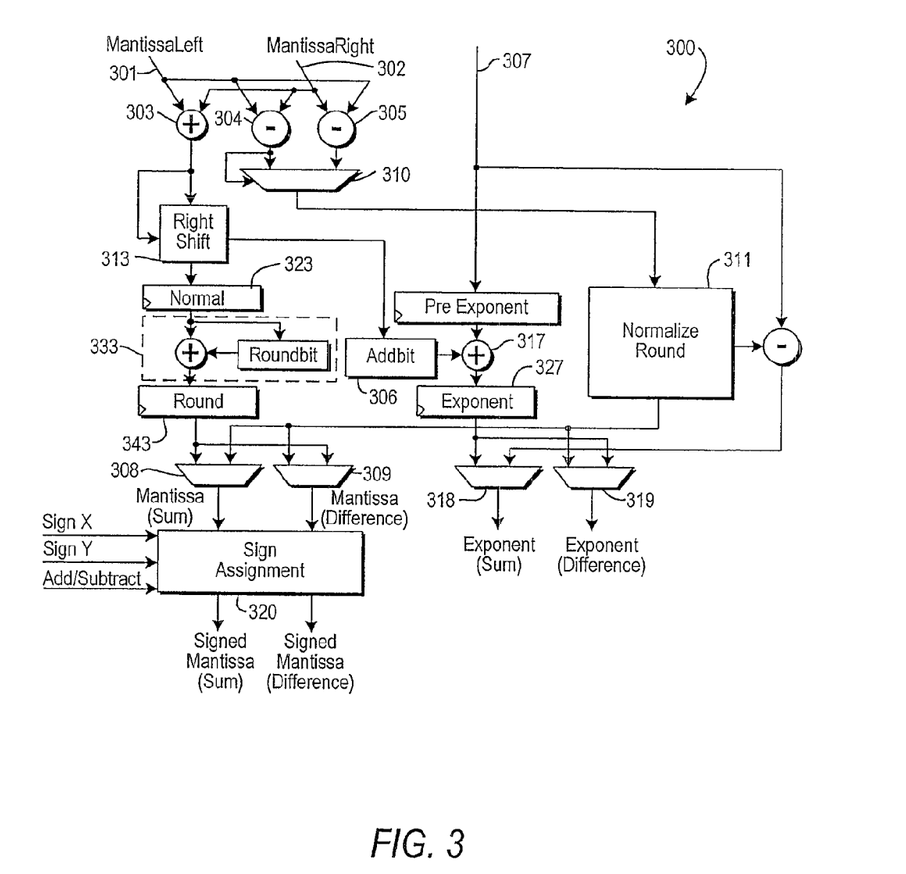
FIG. 3 shows an arrangement in accordance with an embodiment of the invention for computing the sum and difference of two inputs.

In accordance with an embodiment of the invention, arrangement 300 of FIG. 3 may be provided to compute the sum and difference of two inputs 301, 302. Adder 303 may provide the sum of inputs 301 and 302, subtractor 304 may provide the difference between input 301 and input 302, and subtractor 305 may provide the difference between input 302 and input 301. However if one or both of inputs 301, 302 is the mantissa of a negative number, adder 303 may compute a difference, while one of subtractors 304, 305 may compute a sum. For example, the magnitude of input 301 may denoted A and the magnitude of input 302 may be denoted B, with both A and B being positive values. If both input 301 and input 302 are mantissas of positive numbers, adder 303 and subtractors 304, 305 will compute A+B, A−B and B−A, respectively. If both input 301 and input 302 are mantissas of negative numbers, adder 303 and subtractors 304, 305 will compute A+B, B−A and A−B, respectively. If one of inputs 301, 302 is the mantissa of a positive number and the other of inputs 301, 302 is the mantissa of a negative number, then adder 303 will compute one of the differences, one of subtractors 304, 305 will compute the other difference, and the other of subtractors 304, 305 will compute the sum.

Although inputs A and B are always positive values, the outputs of adder 303 and subtractors 304, 305 are signed numbers. Which of these various sums and differences will be considered the mantissa of the final sum and which be considered the mantissa of the final difference will be determined by the signs of the input numbers as discussed below.

As stated above, the output path of adder 303 will require at most a one-bit right-shift 313 to provide normalized sum 323, which is then rounded at 333. The normalization and rounding may provide bits 306, equalling 0, +1 or +2, by which input exponent 307 is adjusted at 317 to yield adjusted exponent 327. Rounded sum 343 is provided as an input to each of multiplexers 308, 309 which select the correct mantissa results as discussed below. Similarly, adjusted exponent 327 is provided as an input to each of multiplexers 318, 319 which selects the correct exponent results as discussed below.

In the subtraction path, multiplexer 310 selects whichever difference 304 or 305 is positive. In a signed-number system where positive numbers begin with 0 and negative numbers begin with 1, the selection can be made by using the most-significant bit of difference 304 as the control bit for multiplexer 310 (assuming difference 304 is on the "0" input). The output of multiplexer 310 may be processed by a substantially standard (re)normalize/round path 311 (addition/subtraction having already occurred). As stated above, in the subtraction path, the degree of bit-shifting may be large or small depending on relative magnitudes.

(Re)normalize/round path 311 may output a mantissa value 321 which may be provided to multiplexers 308, 309 which select the correct mantissa results as discussed below. (Re)normalize/round path 311 also may output an adjustment value 331 for input exponent 307 to yield adjusted exponent 327, which is provided as an input to each of multiplexers 318, 319 which selects the correct exponent results as discussed below.

After the two paths have been calculated, they have to be assigned to the correct outputs at multiplexers 308, 309. The magnitudes or mantissas can be decoded from the input signs, as shown in the following table, in which input 301 is denoted as "X" and has magnitude or mantissa "A" and input 302 is denoted as "Y" and has magnitude or mantissa "B." The signs of the results are assigned in sign assignment stage 320, also as shown in the table. The correct exponents at multiplexers 318, 319 follow the magnitudes at multiplexers 308, 309.

| Sign X | Sign Y | |X + Y| | Sign (X + Y) | |X − Y| | Sign (X − Y) |
|---|---|---|---|---|---|
| + | + | A + B | + | A − B | Sign (A − B) |
| + | − | A − B | Sign (A − B) | A + B | + |
| − | + | A − B | Sign (B − A) | A + B | − |
| − | − | A + B | − | A − B | Sign (B − A) |

Thus it is seen that only one standard add(subtract)/(re)normalize/round path is required to perform two simultaneous floating point additions and subtractions on the same inputs. The second path can be replaced by a simple one-bit shift and rounding function, as shown. The logic resources need to simultaneously calculate the addition and subtraction of two floating point numbers therefore are barely more—i.e., about 10% more—than the logic resources needed for one addition or subtraction.

One potential use for the present invention may be in programmable integrated circuit devices such as programmable logic devices, where programming software can be provided to allow users to configure a programmable device to perform simultaneous floating point addition and subtraction. The result would be that fewer logic resources of the programmable device would be consumed. And where the programmable device is provided with a certain number of dedicated blocks for arithmetic functions (to spare the user from having to configure arithmetic functions from general-purpose logic), the number of dedicated blocks needed to be provided (which may be provided at the expense of additional general-purpose logic) can be reduced (or sufficient dedicated blocks for more operations, without further reducing the amount of general-purpose logic, can be provided).

Instructions for carrying out a method according to this invention for programming a programmable device to perform simultaneous floating point addition and subtraction may be encoded on a machine-readable medium, to be executed by a suitable computer or similar device to implement the method of the invention for programming or configuring PLDs or other programmable devices to perform addition and subtraction operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 4:
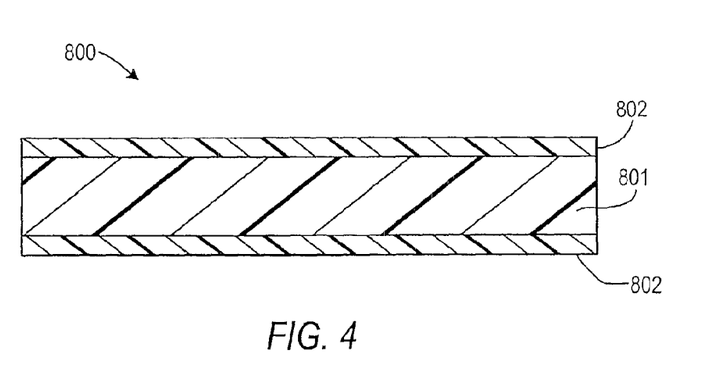
FIG. 4 is a cross-sectional view of a magnetic data storage medium encoded with a set of machine-executable instructions for performing the method according to the present invention.

FIG. 4 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 5:
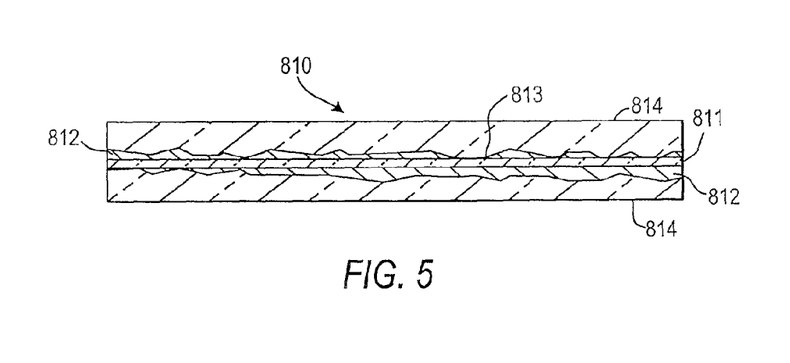
FIG. 5 is a cross-sectional view of an optically readable data storage medium encoded with a set of machine executable instructions for performing the method according to the present invention.

FIG. 5 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

A PLD 90 programmed according to the present invention may be used in many kinds of electronic devices. One possible use is in a data processing system 900 shown in FIG. 6. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 6:
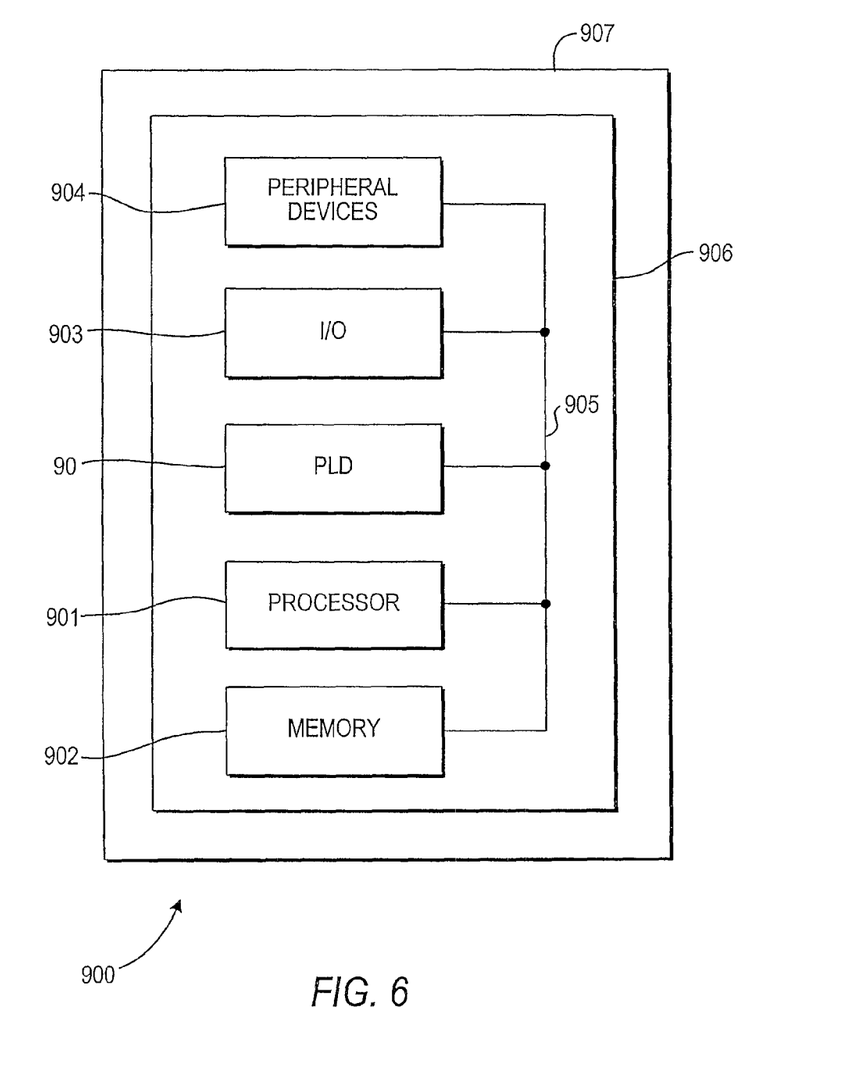
FIG. 6 is a simplified block diagram of an illustrative system employing a programmable logic device incorporating the present invention.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Combined floating-point addition and subtraction circuitry for both adding and subtracting a first signed floating-point input number and a second signed floating-point input number, wherein each of said first and second signed floating-point input numbers has a respective sign, a respective mantissa and a respective exponent, to provide a sum and a difference of said first and second signed floating-point numbers, said combined floating-point addition and subtraction circuitry comprising:

a first mantissa computation path including a first adder for adding said mantissas of said first and second signed floating-point numbers, a one-bit right-shifting circuit for controllably shifting output of said first adder to normalize said output of said first adder, and rounding circuitry for (a) providing a first candidate mantissa and (b) providing a first exponent-adjustment bit;

a second mantissa computation path including a first subtractor for subtracting said mantissa of said second signed floating-point number from said mantissa of said first signed floating-point number to provide a first mantissa difference, a second subtractor for subtracting said mantissa of said first signed floating-point number from said mantissa of said second signed floating-point number to provide a second mantissa difference, a selector for selecting as a mantissa difference output one of said first and second mantissa differences that is positive, and a normalize-and-round circuit for (a) providing a second candidate mantissa and (b) providing a second exponent-adjustment bit; and a selection stage that selects, based on said respective signs, both (a) a mantissa of said sum of said first and second signed floating point numbers from among inputs including both of said first and second candidate mantissas, and (b) a mantissa of said difference of said first and second signed floating point numbers from among inputs including both of said first and second candidate mantissas.

2. The combined floating-point addition and subtraction circuitry of claim 1 further comprising a shared input stage that determines a larger and a smaller one of said respective exponents, determines a difference between said larger exponent and said smaller exponent, and right-shifts, by said difference between said larger exponent and said smaller exponent, said respective mantissa of said one of said input floating-point numbers having said smaller exponent.

3. The combined floating-point addition and subtraction circuitry of claim 1 wherein:
said first and second mantissa differences are represented by a number format in which one bit represents sign;
said selector is a multiplexer; and
said one bit of one of said mantissa differences is used as a control bit for said multiplexer.

4. The combined floating-point addition and subtraction circuitry of claim 1 wherein:
said selection stage comprises a plurality of selection stage multiplexers; and
said respective signs determine control bits for said selection stage multiplexers.

5. The combined floating-point addition and subtraction circuitry of claim 4 wherein:
said selection stage comprises two mantissa selection multiplexers for selecting said one of said first and second candidate mantissas;
one of said mantissa selection multiplexers receives said first candidate mantissa at a first input thereof and said second candidate mantissa at a second input thereof;
another of said mantissa selection multiplexers receives said second candidate mantissa at a first input thereof and said first candidate mantissa at a second input thereof; and
said control bits select one of (a) both said first inputs, and (b) both said second inputs.

6. The combined floating-point addition and subtraction circuitry of claim 1 further comprising:
a shared input stage that determines a larger and a smaller one of said respective exponents and selects said larger exponent as an input stage output exponent;
a first exponent computation path for combining said input stage output exponent and said first exponent adjustment bit to provide a first candidate exponent; and
a second exponent computation path for combining said input stage output exponent and said second exponent adjustment bit to provide a second candidate exponent; wherein:
said selection stage also selects one of said first and second candidate exponents for said sum of said first and second signed floating point numbers, and another one of said first and second candidate exponents for said difference of said first and second signed floating point numbers.

7. The combined floating-point addition and subtraction circuitry of claim 6 wherein:
said selection stage comprises two exponent selection multiplexers for selecting said one of said first and second candidate exponents;
one of said exponent selection multiplexers receives said first candidate exponent at a first input thereof and said second candidate exponent at a second input thereof;
another of said exponent selection multiplexers receives said second candidate exponent at a first input thereof and said first candidate exponent at a second input thereof; and
said control bits select one of (a) both said first inputs, and (b) both said second inputs.

8. The combined floating-point addition and subtraction circuitry of claim 1 further comprising a sign assignment stage for assigning a respective sign to said sum of said first and second signed floating point numbers and to said difference of said first and second signed floating point numbers.

9. A method of configuring a programmable integrated circuit device as combined floating-point addition and subtraction circuitry for both adding and subtracting a first signed floating-point input number and a second signed floating-point input number, wherein each of said first and second signed floating-point input numbers has a respective sign, a respective mantissa and a respective exponent, to provide a sum and a difference of said first and second signed floating-point numbers, said method comprising:
configuring logic of said programmable integrated circuit device as a first mantissa computation path including a first adder for adding said mantissas of said first and second signed floating-point numbers, a one-bit right-shifting circuit for controllably shifting output of said first adder to normalize said output of said first adder, and rounding circuitry for (a) providing a first candidate mantissa and (b) providing a first exponent-adjustment bit;
configuring logic of said programmable integrated circuit device as a second mantissa computation path including a first subtractor for subtracting said mantissa of said second signed floating-point number from said mantissa of said first signed floating-point number to provide a first mantissa difference, a second subtractor for subtracting said mantissa of said first signed floating-point number from said mantissa of said second signed floating-point number to provide a second mantissa difference, a selector for selecting as a mantissa difference output one of said first and second mantissa differences that is positive, and a normalize-and-round circuit for (a) providing a second candidate mantissa and (b) providing a second exponent-adjustment bit; and
configuring logic of said programmable integrated circuit device as a selection stage for selecting, based on said respective signs, both (a) a mantissa of said sum of said first and second signed floating point numbers from among inputs including both of said first and second candidate mantissas, and (b) a mantissa of said difference of said first and second signed floating point numbers from among inputs including both of said first and second candidate mantissas.

10. The method of claim 9 further comprising configuring logic of said programmable integrated circuit device as a shared input stage that determines a larger and a smaller one of said respective exponents, determines a difference between said larger exponent and said smaller exponent, and right-shifts, by said difference between said larger exponent and said smaller exponent, said respective mantissa of said one of said input floating-point numbers having said smaller exponent.

11. The method of claim 9 wherein:
said first and second mantissa differences are represented by a number format in which one bit represents sign; and
said configuring logic of said programmable integrated circuit device as a second mantissa computation path comprises:
configuring a multiplexer as said selector, and
configuring said one bit of one of said mantissa differences to be used as a control bit for said multiplexer.

12. The method of claim 9 wherein said configuring logic of said programmable integrated circuit device as a selection stage comprises:
configuring logic of said programmable integrated circuit device as a plurality of selection stage multiplexers; and
configuring said respective signs to determine control bits for said selection stage multiplexers.

13. The method of claim 12 wherein said configuring logic of said programmable integrated circuit device as a selection stage further comprises:
configuring logic of said programmable integrated circuit device as two mantissa selection multiplexers for selecting said one of said first and second candidate mantissas;
configuring one of said mantissa selection multiplexers to receive said first candidate mantissa at a first input thereof and said second candidate mantissa at a second input thereof;
configuring another of said mantissa selection multiplexers to receive said second candidate mantissa at a first input thereof and said first candidate mantissa at a second input thereof; and
configuring said control bits to select one of (a) both said first inputs, and (b) both said second inputs.

14. The method of claim 9 further comprising:
configuring logic of said programmable integrated circuit device as a shared input stage that determines a larger and a smaller one of said respective exponents and selects said larger exponent as an input stage output exponent;
configuring logic of said programmable integrated circuit device as a first exponent computation path for combining said input stage output exponent and said first exponent adjustment bit to provide a first candidate exponent; and
configuring logic of said programmable integrated circuit device as a second exponent computation path for combining said input stage output exponent and said second exponent adjustment bit to provide a second candidate exponent; wherein:
configuring logic of said programmable integrated circuit device as a selection stage comprises also configuring said selection stage to select one of said first and second candidate exponents for said sum of said first and second signed floating point numbers, and another one of said first and second candidate exponents for said difference of said first and second signed floating point numbers.

15. The method of claim 14 wherein said configuring logic of said programmable integrated circuit device as a selection stage further comprises:
configuring logic of said programmable integrated circuit device as two exponent selection multiplexers for selecting said one of said first and second candidate exponents;
configuring one of said exponent selection multiplexers to receive said first candidate exponent at a first input thereof and said second candidate exponent at a second input thereof;
configuring another of said exponent selection multiplexers to receive said second candidate exponent at a first input thereof and said first candidate exponent at a second input thereof; and
configuring said control bits to select one of (a) both said first inputs, and (b) both said second inputs.

16. The method of claim 9 further comprising configuring logic of said programmable integrated circuit device as a sign assignment stage for assigning a respective sign to said sum of said first and second signed floating point numbers and to said difference of said first and second signed floating point numbers.

17. A programmable integrated circuit device configured as combined floating-point addition and subtraction circuitry for both adding and subtracting a first signed floating-point input number and a second signed floating-point input number, wherein each of said first and second signed floating-point input numbers has a respective sign, a respective mantissa and a respective exponent, to provide a sum and a difference of said first and second signed floating-point numbers, said configured programmable integrated circuit device comprising:
logic configured as a first mantissa computation path including a first adder for adding said mantissas of said first and second signed floating-point numbers, a one-bit right-shifting circuit for controllably shifting output of said first adder to normalize said output of said first adder, and rounding circuitry for (a) providing a first candidate mantissa and (b) providing a first exponent-adjustment bit;
logic configured as a second mantissa computation path including a first subtractor for subtracting said mantissa of said second signed floating-point number from said mantissa of said first signed floating-point number to provide a first mantissa difference, a second subtractor for subtracting said mantissa of said first signed floating-point number from said mantissa of said second signed floating-point number to provide a second mantissa difference, a selector for selecting as a mantissa difference output one of said first and second mantissa differences that is positive, and a normalize-and-round circuit for (a) providing a second candidate mantissa and (b) providing a second exponent-adjustment bit; and
logic configured as a selection stage for selecting, based on said respective signs, both (a) a mantissa of said sum of said first and second signed floating point numbers from among inputs including both of said first and second candidate mantissas, and (b) a mantissa of said difference of said first and second signed floating point numbers from among inputs including both of said first and second candidate mantissas.

18. The configured programmable integrated circuit device of claim 17 further comprising logic configured as a shared input stage that determines a larger and a smaller one of said respective exponents, determines a difference between said larger exponent and said smaller exponent, and right-shifts, by said difference between said larger exponent and said smaller exponent, said respective mantissa of said one of said input floating-point numbers having said smaller exponent.

19. The configured programmable integrated circuit device of claim 17 wherein:
said first and second mantissa differences are represented by a number format in which one bit represents sign;

a multiplexer is configured as said selector; and
said one bit of one of said mantissa differences is configured to be used as a control bit for said multiplexer.

20. The configured programmable integrated circuit device of claim 17 wherein said logic configurable as a selection stage comprises:
logic configured as a plurality of selection stage multiplexers; and
logic configured to determine control bits for said selection stage multiplexers from said respective signs.

21. The configured programmable integrated circuit device of claim 20 wherein:
said logic configured as a selection stage further comprises logic configured as two mantissa selection multiplexers for selecting said one of said first and second candidate mantissas;
logic configured as one of said mantissa selection multiplexers is configured to receive said first candidate mantissa at a first input thereof and said second candidate mantissa at a second input thereof; and
logic configured as another of said mantissa selection multiplexers is configured to receive said second candidate mantissa at a first input thereof and said first candidate mantissa at a second input thereof; said logic configured as a selection stage further comprising:
logic configured to use said control bits to select one of (a) both said first inputs, and (b) both said second inputs.

22. The configured programmable integrated circuit device of claim 17 further comprising:
logic configured as a shared input stage that determines a larger and a smaller one of said respective exponents and selects said larger exponent as an input stage output exponent;
logic configured as a first exponent computation path for combining said input stage output exponent and said first exponent adjustment bit to provide a first candidate exponent; and
logic configured as a second exponent computation path for combining said input stage output exponent and said second exponent adjustment bit to provide a second candidate exponent; wherein:
said logic configured as said selection stage is also configured to select one of said first and second candidate exponents for said sum of said first and second signed floating point numbers, and another one of said first and second candidate exponents for said difference of said first and second signed floating point numbers.

23. The configured programmable integrated circuit device of claim 22 wherein:
said logic configured as a selection stage further comprises logic configured as two exponent selection multiplexers for selecting said one of said first and second candidate exponents;
said logic configured as one of said exponent selection multiplexers is configured to receive said first candidate exponent at a first input thereof and said second candidate exponent at a second input thereof; and
said logic configured as another of said exponent selection multiplexers is configurable to receive said second candidate exponent at a first input thereof and said first candidate exponent at a second input thereof; said logic configured as a selection stage further comprising:
logic configured to use said control bits to select one of (a) both said first inputs, and (b) both said second inputs.

24. The configured programmable integrated circuit device of claim 17 further comprising logic configured as a sign assignment stage for assigning a respective sign to said sum of said first and second signed floating point numbers and to said difference of said first and second signed floating point numbers.

25. A non-transitory machine-readable data storage medium encoded with machine-executable instructions for configuring a programmable integrated circuit device as combined floating-point addition and subtraction circuitry for both adding and subtracting a first signed floating-point input number and a second signed floating-point input number, wherein each of said first and second signed floating-point input numbers has a respective sign, a respective mantissa and a respective exponent, to provide a sum and a difference of said first and second signed floating-point numbers, said instructions comprising:
instructions to configure logic of said programmable integrated circuit device as a first mantissa computation path including a first adder for adding said mantissas of said first and second signed floating-point numbers, a one-bit right-shifting circuit for controllably shifting output of said first adder to normalize said output of said first adder, and rounding circuitry for (a) providing a first candidate mantissa and (b) providing a first exponent-adjustment bit;
instructions to configure logic of said programmable integrated circuit device as a second mantissa computation path including a first subtractor for subtracting said mantissa of said second signed floating-point number from said mantissa of said first signed floating-point number to provide a first mantissa difference, a second subtractor for subtracting said mantissa of said first signed floating-point number from said mantissa of said second signed floating-point number to provide a second mantissa difference, a selector for selecting as a mantissa difference output one of said first and second mantissa differences that is positive, and a normalize-and-round circuit for (a) providing a second candidate mantissa and (b) providing a second exponent-adjustment bit; and
instructions to configure logic of said programmable integrated circuit device as a selection stage for selecting, based on said respective signs, both (a) a mantissa of said sum of said first and second signed floating point numbers from among inputs including both of said first and second candidate mantissas, and (b) a mantissa of said difference of said first and second signed floating point numbers from among inputs including both of said first and second candidate mantissas.

26. The non-transitory machine-readable data storage medium of claim 25 wherein said instructions further comprise:
instructions to configure logic of said programmable integrated circuit device as a shared input stage that determines a larger and a smaller one of said respective exponents, determines a difference between said larger exponent and said smaller exponent, and right-shifts, by said difference between said larger exponent and said smaller exponent, said respective mantissa of said one of said input floating-point numbers having said smaller exponent.

27. The non-transitory machine-readable data storage medium of claim 25 wherein said instructions to configure logic of said programmable integrated circuit device as a selection stage comprise:
instructions to configure logic of said programmable integrated circuit device as a plurality of selection stage multiplexers; and
instructions to configure said respective signs to determine control bits for said selection stage multiplexers.

28. The non-transitory machine-readable data storage medium of claim 27 wherein said instructions further comprise:
- instructions to configure logic of said programmable integrated circuit device as a shared input stage that determines a larger and a smaller one of said respective exponents and selects said larger exponent as an input stage output exponent;
- instructions to configure logic of said programmable integrated circuit device as a first exponent computation path for combining said input stage output exponent and said first exponent adjustment bit to provide a first candidate exponent; and
- instructions to configure logic of said programmable integrated circuit device as a second exponent computation path for combining said input stage output exponent and said second exponent adjustment bit to provide a second candidate exponent; wherein:
- said instructions to configure logic of said programmable integrated circuit device as a selection stage also comprise instructions to configure said selection stage to select one of said first and second candidate exponents for said sum of said first and second signed floating point numbers, and another one of said first and second candidate exponents for said difference of said first and second signed floating point numbers.

* * * * *